United States Patent
Frignac et al.

(10) Patent No.: US 6,909,531 B2
(45) Date of Patent: Jun. 21, 2005

(54) OPTICAL (DE-)INTERLEAVER AND METHOD OF (DE-)INTERLEAVING OPTICAL SIGNALS

(75) Inventors: Yann Frignac, Paris (FR); Gabriel Charlet, Villiers-le-Bacle (FR)

(73) Assignee: Alcatel, Paris (FR)

(*) Notice: Subject to any disclaimer, the term of this patent is extended or adjusted under 35 U.S.C. 154(b) by 9 days.

(21) Appl. No.: 10/408,553

(22) Filed: Apr. 8, 2003

(65) Prior Publication Data

US 2003/0202232 A1 Oct. 30, 2003

(30) Foreign Application Priority Data

Apr. 30, 2002 (EP) ............................................. 02360138

(51) Int. Cl.$^7$ ................................................. G02F 1/01
(52) U.S. Cl. ........................ 359/279; 359/115; 359/122; 359/124; 359/308; 398/48; 398/68; 398/79
(58) Field of Search ................................ 359/115, 122, 359/124, 279, 308, 618, 498, 497, 499; 398/85, 43, 48, 68, 79

(56) References Cited

U.S. PATENT DOCUMENTS

| | | | |
|---|---|---|---|
| 6,212,313 B1 * | 4/2001 | Li | ............................... 385/24 |
| 6,268,951 B1 | 7/2001 | Chen et al. | |
| 6,301,046 B1 | 10/2001 | Tai et al. | |
| 6,574,049 B1 * | 6/2003 | Qian et al. | ................... 359/634 |
| 6,741,813 B2 * | 5/2004 | Su et al. | ....................... 398/79 |
| 2002/0030866 A1 | 3/2002 | Wu et al. | |
| 2003/0128986 A1 * | 7/2003 | Tai et al. | ...................... 398/84 |

FOREIGN PATENT DOCUMENTS

EP          1 109 342 A2       6/2001

* cited by examiner

*Primary Examiner*—Ricky Mack
*Assistant Examiner*—Brandi N. Thomas
(74) *Attorney, Agent, or Firm*—Sughrue Mion, PLLC

(57) ABSTRACT

The invention relates to an interleaver circuit (10, 10') for interleaving optical signals, comprising a first and a second input port (12, 14), an output port (16), a first optical filter (18; 18') that has a first filter function with periodic passbands (32, 34, 36) and is connected to the first input port (12), a second optical filter (20; 20') that has a second filter function with periodic passbands (38, 40) and is connected to the second input port (14), and an optical interleaver (22). The latter comprises a multiplexing port (23) connected to the output port (16) and two de-multiplexing ports (24, 26) connected to the first input port (12) via the first optical filter (18; 18') and the second optical filter (20; 20'), respectively. At least one optical filter (18, 20; 18', 20') is tunable such that the passband frequencies are collectively shiftable without altering the periodicity of the filter function.

10 Claims, 4 Drawing Sheets

OPTICAL (DE-)INTERLEAVER AND METHOD OF (DE-)INTERLEAVING OPTICAL SIGNALS

BACKGROUND OF THE INVENTION

The invention is based on a priority application EP 02360138.8 which is hereby incorporated by reference.

The invention relates to a (de-)interleaver circuit for (de-)interleaving optical signals. The invention further relates to a method of interleaving a first and a second optical signal each having a plurality of multiplexed channels of light, and a method of de-interleaving an optical signal having a plurality of interleaved multiplexed channels of light.

Optical Wavelength Division Multiplexing (WDM) and Dense Wavelength Division Multiplexing (DWDM) are commonly employed technologies in optical transmission systems as means to use available resources more efficiently. In WDM and DWDM transmission systems, multiple optical signals are simultaneously transmitted over a single optical fiber. Each signal is generated from a carrier signal having a pre-allocated carrier wavelength. At a transmitter end, the carrier signals are usually amplitude modulated by digital information signals. Due to the different carrier wavelength, the signals transmitted in the optical fiber do not substantially interfere with each other. At a receiver end, the signals with different wavelengths are separated by narrow band filters and then detected or used for further processing.

In such systems, each signal is, mainly due to the modulation, not transmitted with only a single wavelength but within a narrow wavelength band that is centered around a so-called center wavelength. Such a band is also referred to as an optical channel. Each channel is therefor characterized by a single center wavelength. In practice, the number of channels that can be carried by a single optical fiber in a WDM or DWDM system is limited by crosstalk, narrow operating bandwidth of optical amplifiers and/or optical fiber non-linearities.

Currently, internationally agreed upon channel spacing for high-speed optical transmission systems is 100 GHz, equivalent to 0.8 nm spacing between center wavelengths of adjacent channels. However, recent research activities focus on systems having 40 channels with only 50 GHz channel spacing.

Such channel spacings in high-speed WDM and DWDM systems can be achieved with components referred to generically as optical interleavers. An interleaver is a multiplexer that takes optical signals of different channels from two or more different input ports and combines them so that they may be coupled to an output port for transmission over a single optical fiber. A de-interleaver is a de-multiplexer that divides a signal containing two or more different channels according to their wavelength bands and directs each channel to a different dedicated fiber. A de-interleaver can also be used as a router that can, according to control signals, selectively direct each channel to a desired coupling between an input channel and an output port.

The general principle behind (de-)interleavers is an interferometric overlap of multiple beams. The devices exploit the physical effect that interference creates a periodically repeating output (fringes) as different integral multiples of wavelengths pass through the device. Since the path of light is generally reversible, the same device may be used as an interleaver or a de-interleaver, depending on the port(s) into which light is coupled to.

SUMMERY OF THE INVENTION

Currently, (de-)interleavers are available that are based on fused-fiber interferometers, liquid crystals and birefringent crystals. Particular attention has been given to Fabry-Perot and Mach-Zehnder interferometers because of their interesting periodic filter response. Interferometers of the latter kind are, for example, described in US-B1-6 268 951.

Such devices are usually characterized by their spectral transmission and reflectivity response. The spectral response of a Fabry-Perot etalon, for example, shows periodically alternating transmission and reflectivity peaks. The spacing between a transmission and a subsequent reflectivity peak equals half of the spacing between two adjacent transmission peaks or reflectivity peaks. This results in the ability to de-multiplex regularly spaced channels such that two adjacent channels are spacially separated. The same applies, vice versa, if the Fabry-Perot etalon is used as an interleaver. The spectral response of a Mach-Zehnder interferometer comprises regularly spaced transmission peaks, but no reflectivity peaks.

For the sake of simplicity, the spectral transmission and reflectivity response of the (de-)interleavers will in the following be referred to as "filter function" although an optical (de-)interleaver is, from a functional point of view, not an optical filter but an optical (de-)multiplexer. Ideally, the filter function of a (de-)interleaver should have periodically interleaved passbands in which the transmission/reflectivity is constant. Devices whose filter functions approximate the aforementioned ideal filter function are usually referred to as "flat top" interleavers. Such an ideal filter function ensures minimal crosstalk between adjacent channels and reduces signal deterioration. Many attempts have been made to improve the filter function of interleavers. However, known "flat top" interleavers have a passband periodicity that is intrinsically linked with the width of the passbands. This aspect considerably reduces the scope of applications of such interleavers in commercial optical transmission systems.

It is an object of the present invention to provide a (de-)interleaver circuit for (de-)interleaving optical signals and a method for (de-)interleaving optical signals as mentioned at the outset that broadens the range of possible applications for (de-)interleavers in optical transmission systems.

This object is achieved by an interleaver circuit comprising a first input port, a second input port, an output port, a first optical filter that has a first filter function with periodic passbands and is connected to the first input port, a second optical filter that has a second filter function with periodic passbands and is connected to the second input port, an optical interleaver comprising a multiplexing port connected to the output port, a first de-multiplexing port connected to the first input port via the first optical filter, and a second de-multiplexing port connected to the second input port via the second optical filter, wherein at least one optical filter is tunable such that the passband frequencies are collectively shiftable without altering the periodicity of the filter function.

The object is further achieved by a method comprising sets of:

filtering the first optical signal with a first optical filter that has a first filter function with periodic passbands;

filtering the second optical signal with a second optical filter that has a second filter function with periodic passbands;

tuning at least one optical filter such that its passband frequencies are aligned with the plurality of multiplexed channels of the respective optical signal, thereby collectively shifting the passband frequencies without altering the periodicities of the filter function;

combining the filtered optical signals in an optical interleaver in order to obtain an optical signal having a plurality of interleaved multiplexed channels of light.

The object is still further achieved by a de-interleaver circuit and a method of de-interleaving an optical signal, wherein the de-interleaver circuit and the method of de-interleaving comprise essentially the aforementioned features, but with the input ports and the output ports mutually exchanged.

By cascading two optical filters with an interleaver it is possible to obtain an equivalent optical interleaver having a filter function with very small passbands.

Since at least one optical filter is tunable, this result is also achieved in those cases in which the optical signals to be interleaved have periodical but irregular channel spacings. By tuning one or both optical filters an interleaved optical signal with an irregular channel spacing can be obtained. It is thus possible to use the new interleaver circuit in optical transmission systems in which it is difficult to establish or sustain a predetermined relationship between the channels of optical signals that are to be interleaved. Furthermore, the new device displays, as compared with conventional Fabry-Perot interleavers, an improved signal rejection ratio.

In this context it is therefor preferred if the at least one optical filter is tuned such that the first filter function is offset with respect to the second filter function by an amount that is distinct from half of a passband spacing by which the passbands of the first and the second filter function are spaced apart.

It should be noted, however, that such an offset can also be achieved if none of the filters is tunable. It is then only required to fabricate the filters in such a manner that said offset condition is achieved. In those cases in which the frequencies of the optical signals to be interleaved are exactly known beforehand, an interleaver circuit with such ready-made filters is cheaper than a circuit with tunable filters.

It should be understood that the same considerations apply, mutatis mutandis, to de-interleavers since the pass of light is reversible. Therefor, for the sake of simplicity, the invention is in the following explained only with reference to the new interleaver circuit.

For the new interleaver circuit, any known interleaver may be used as optical interleaver that combines the filtered optical signals. Preferably, this optical interleaver is a "flat top" interleaver, i.e. it has a filter function with periodically repeated passbands in which the transmission/reflectivity is constant. The multiplexing port of this optical interleaver is to be understood as the port through which an optical signal with interleaved channels may be coupled from the interleaver into an optical fiber or from the optical fiber into the interleaver. The de-multiplexing ports are those ports through which an optical signal with de-interleaved channels may be coupled from the interleaver into optical fibers or from optical fibers into the interleaver.

The new interleaver circuit is not restricted to embodiments with only two input ports. Rather, interleaver circuits with more than two input ports are possible and envisaged as being within the scope of the invention.

The optical filters of the new interleaver are tunable such that the passband frequencies are collectively shiftable without (significantly) altering the periodicity of the filter function. Suitable optical filters of this kind include, for example, conventional Fabry-Perot etalons. In these cases, a shift of the passband frequencies can be achieved by varying the optical pass length difference between two light beams within the device.

It is preferred, however, that the at least one optical filter is a tunable optical interleaver with only one de-multiplexing port being used.

Since optical interleavers have the property that the passband frequencies can collectively be shifted without altering the periodicity of the filter function, commercially available interleavers, particularly those based on Fabry-Perot interferometers, can be advantageously used as tunable optical filters. "Flat top" interleavers are also preferred for the interleavers used as filters.

In such an embodiment it is further preferred that the interleaver circuit comprises temperature control means for controlling the temperature of the tunable optical interleaver.

Tuning the optical interleaver by temperature control is particularly advantageous since this allows a fine and very effective tuning of the passband frequency shift.

In another advantageous embodiment, the optical interleaver being connected to the first and the second optical filter is also tunable such that its passbands are collectively shiftable without altering the periodicity of its filter function.

This allows to achieve, if the optical filters are tuned correspondingly, a filter function of the whole interleaver circuit that is globally offset if compared to a non-tuned condition.

It goes without saying that the features described above and those yet to be explained below can be used not only in the respective combinations indicated, but also in other combinations or in isolation, without leaving the context of the present invention.

BRIEF DESCRIPTION OF THE DRAWINGS

Further features and advantages of the invention can be taken from the subsequent description of preferred embodiments with reference to the drawings.

In the drawings:

In FIG. 1, an interleaver circuit is designated in its entirety by reference numeral 10.

Figure 1:
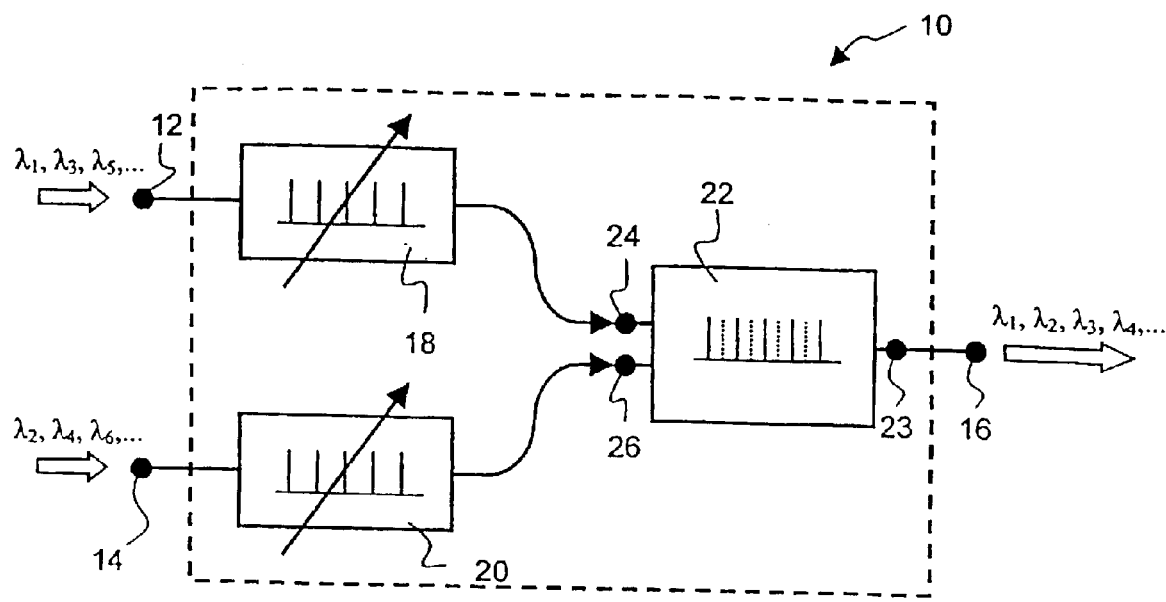
FIG. 1 illustrates one embodiment of an interleaver circuit according to the present invention.

Interleaver circuit 10 has a first input port 12 into which a first light signal can be coupled that comprises a plurality of different channels with center channel wavelengths $\lambda_1$, $\lambda_3$, $\lambda_5$, . . . . The interleaver circuit 10 further has a second input port 14 into which a second light signal can be coupled that comprises a plurality of different channels with center channel wavelengths $\lambda_2$, $\lambda_4$, $\lambda_6$, . . . .

From an output port 16 of the interleaver circuit 10 a multiplexed optical signal can be coupled into an optical fiber or an optical waveguide. In this multiplexed optical signal the channels of the first and second input light signals are interleaved such channels from both input signals alternate. The interleaved optical signal therefore comprises channels with center wavelengths $\lambda_1$, $\lambda_2$, $\lambda_3$, $\lambda_4$, . . . .

The first input port 12 is coupled to a first optical filter 18 with a first filter function that will be explained lateron with reference to FIG. 3a. This first optical filter 18 is tunable such that its passband frequencies are collectively shiftable without altering the periodicity of the filter function.

The second input port 14 is coupled to a second optical filter 20 that has a second filter function that is also tunable in this manner.

The first and second optical filters 18, 20 may, for example, be Fabry-Perot etalons in which the optical path length difference of the interfering beams can be varied. These optical filters can also be realized as complex circuits comprising a plurality of interferometric or polarization-dependent devices as are known in the art.

The first optical filter 18 and the second optical filter 20 are connected to de-multiplexing ports 24 and 26 of an optical interleaver 22. A multiplexing port 23 of the interleaver 22 is connected to the output port 16. The optical interleaver 22 is, in this embodiment, a "flat top" interleaver that may, for example, be based on a Fabry-Perot or Mach-Zehnder interferometer.

Figure 2:
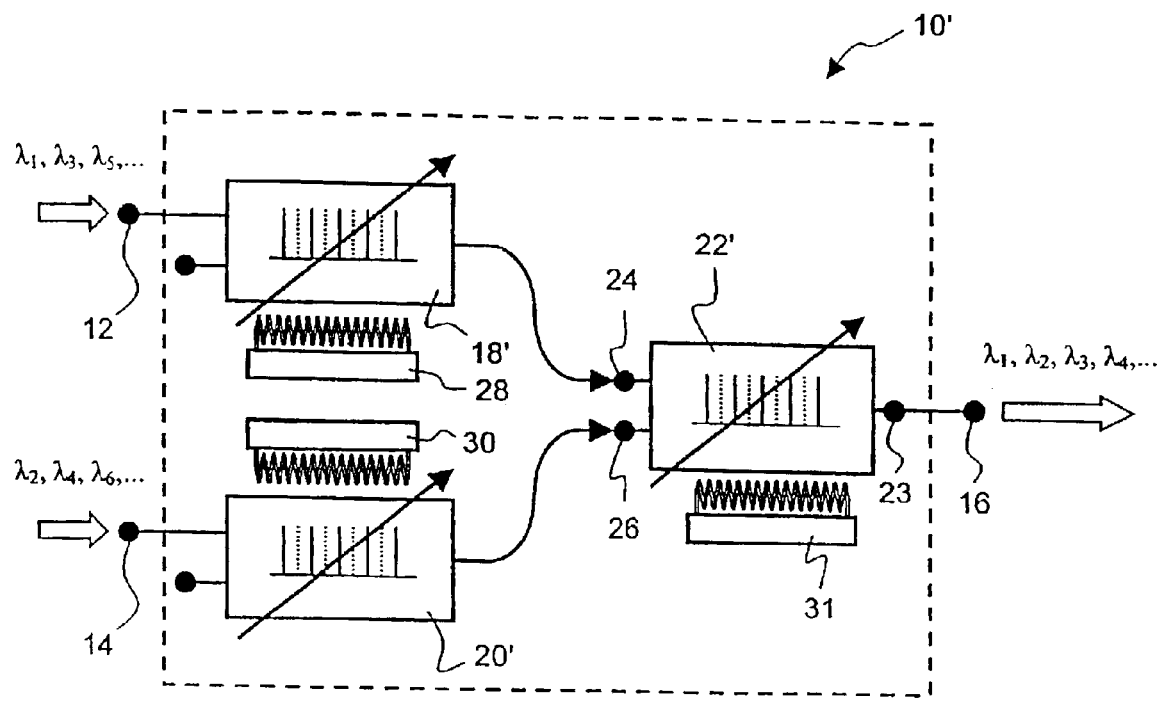
FIG. 2 illustrates another embodiment of an interleaver circuit according to the present invention in which interleavers are used as optical filters.

FIG. 2 shows a second embodiment of an interleaver circuit 10' in which the first and second optical filters 18, 20 are realized as optical interleavers 18', 20' with only one de-multiplexing port being used. Such interleavers 18', 20' have the desired property that their passband frequencies can be collectively shifted without altering the periodicity of the transmission/reflectivity characteristics. Since only one de-multiplexing port is used, the optical interleavers 18', 20' essentially function as optical filters as used in the embodiment 10 shown in FIG. 1.

Apart from that, the interleaver 22' in this embodiment is also tunable such that its passbands are collectively shiftable without altering the periodicity of its filter function.

Tuning of the optical interleavers 18', 20' and 22' can be achieved by temperature control means that are schematically indicated in FIG. 2 by reference numerals 28 for the first interleaver 18', 30 for the second interleaver 20' and 31 for the interleaver 22'. These temperature control means 28, 30 and 31 can be, for example, Peltier elements and may be independently controlled such that the interleavers 18', 20' and 22' can be tuned independently from each other.

The function of the interleaver circuits 10 and 10' is now explained with reference to FIGS. 3a to 8.

FIG. 3 shows, as continuous line, a graph of the spectral intensity distribution (optical power vs. wavelength $\lambda$) of the first input signal coupled into input port 12. The first optical signal comprises three optical channels CH1, CH3 and CH5 that are centered around wavelengths $\lambda_1$, $\lambda_3$, and $\lambda_5$, respectively. A filter function (transmission T vs. wavelength $\lambda$) of the first optical filter 18 is shown in FIG. 3 in broken lines. The first optical filter 18 has three passbands 32, 34 and 36 that are centered around the center wavelengths $\lambda_1$, $\lambda_3$, and $\lambda_5$ of the first optical signal.

Figure 3A:
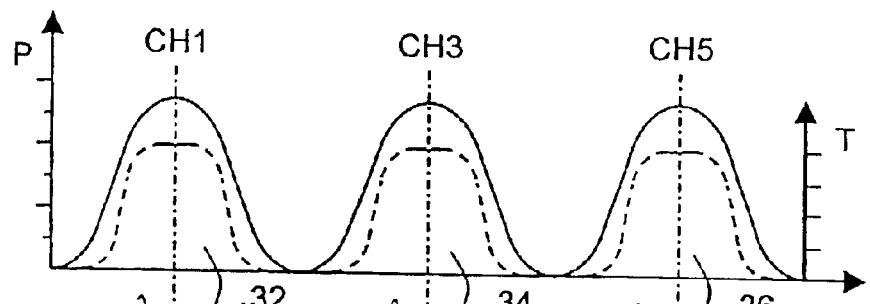
FIG. 3a is a combined graph of the spectral intensity distribution of a first input signal to be interleaved and of the filter function of a first optical filter.
Figure 3B:
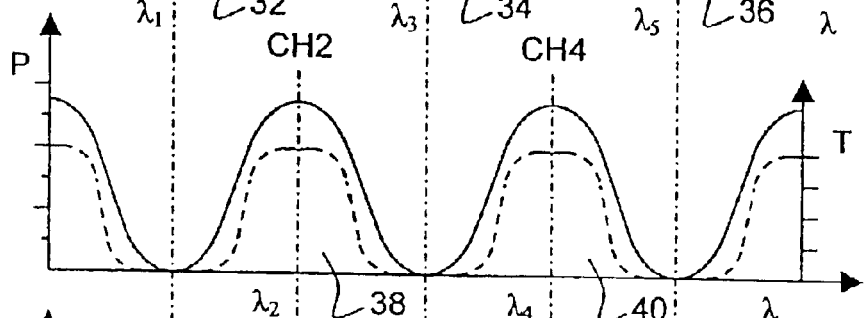
FIG. 3b is a combined graph of the spectral intensity distribution of a second input signal to be interleaved and of the filter function of a second optical filter.

FIG. 3b shows a similar graph for the second input signal, with two channels CH2 and CH4 centered around wavelengths $\lambda_2$ and $\lambda_4$. The filter function of the second optical filter 20, again in broken lines, defines passbands 38 and 40 that are centered around wavelengths $\lambda_2$ and $\lambda_4$, respectively.

Figure 4A:
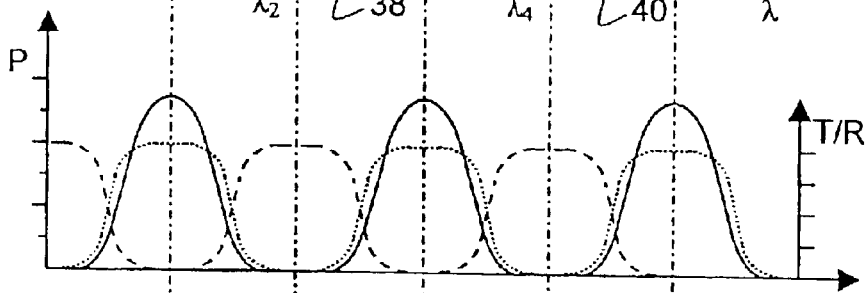
FIG. 4a is a combined graph of the spectral intensity distribution of the filtered input signal of FIG. 3a and of the filter function of an interleaver that is part of the interleaver circuit.

FIG. 4a shows a graph of the spectral intensity distribution of the first input signal as shown in FIG. 3a after having been filtered by the first optical filter 18. This signal may be measured at de-multiplexing port 24 of the interleaver 22. The bandwidth of each optical channel has been reduced due to the filtering by optical filter 18. Furthermore the signal has been slightly weakened due to insertion losses incurred by the optical filter 18. FIG. 4a also shows, in broken and dotted lines, the filter function of interleaver 22 as a combination of a transmission (T) and reflectivity (R) response (T/R vs. wavelength $\lambda$). This function is idealized in the sense that the transmission and the reflectivity responses are approximately rectangular. The actual shape of the transmission and reflectivity responses depends on the type of interferometric device that is used as interleaver 22. The reflectivity and transmission responses are considered, in this context, to be interchangeable in the sense that filtering by reflection or transmission merely affects the selection of the de-multiplexing ports 24 and 26.

Figure 4B:
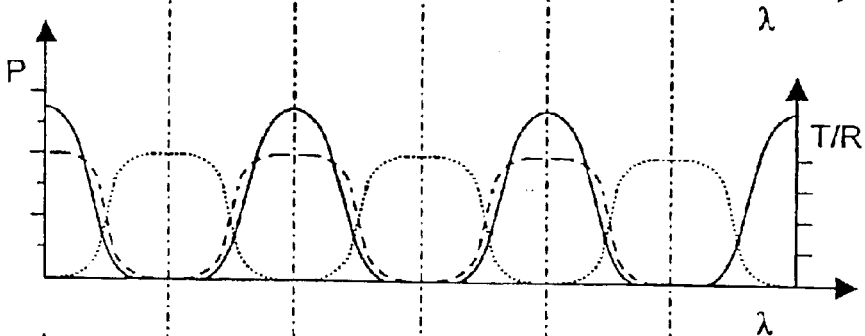
FIG. 4b is a combined graph of the spectral intensity distribution of the filtered input signal of FIG. 3b and of the filter function of the interleaver.

FIG. 4b shows a similar graph for the second optical signal as shown in FIG. 4a for the first optical signal.

Figure 5:
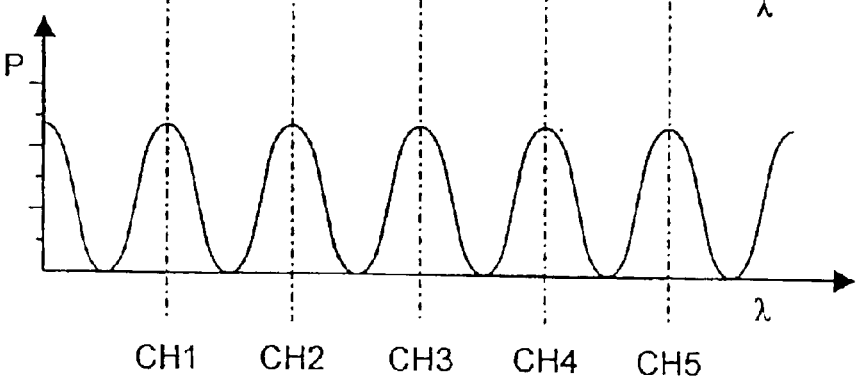
FIG. 5 is a graph of the spectral intensity distribution of the interleaved optical signals of FIGS. 4a and 4b at an output port of the interleaver circuit as shown in FIG. 1 or 2.

FIG. 5 shows the spectral intensity distribution of the interleaved optical signals of FIGS. 4a and 4b at the output port 16 of the interleaver circuit 10 or 10'. Since the transmission and reflectivity responses of interleaver 22 are aligned with the center wavelengths $\lambda_1$, $\lambda_3$, $\lambda_5$ and $\lambda_2$, $\lambda_4$, respectively, the filtered optical signals as shown in FIGS. 4a and 4b are filtered by the interleaver 22 a second time. The bandwidth of the channels is thereby further reduced to such a degree that channel crosstalk is almost completely eliminated. In the interleaved optical signal the channels are equally spaced. This can only be achieved when, on the one hand, the spacing between adjacent channels CHi and CHi+1 equals half of the channel spacing in the first or second optical signals between consecutive channels CHi and CHi+2. On the other hand, it is required that the transmission and reflectivity responses of interleaver 22 are exactly adjusted to the center wavelengths $\lambda_1$, $\lambda_2$, $\lambda_3$, . . . .

The optical interleaver 10 or 10', however, allows to interleave optical channels even in those cases when the aforementioned requirements are not fulfilled.

Figure 6A:
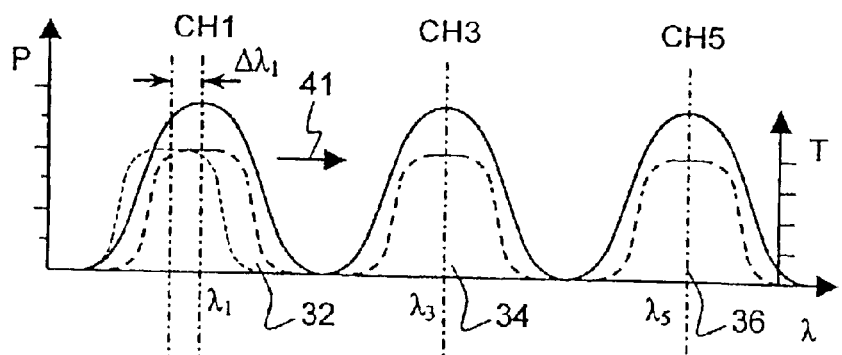
FIG. 6a is a graph as shown in FIG. 3a but with input channels shifted by a wavelength $\Delta\lambda_1$.
Figure 6B:
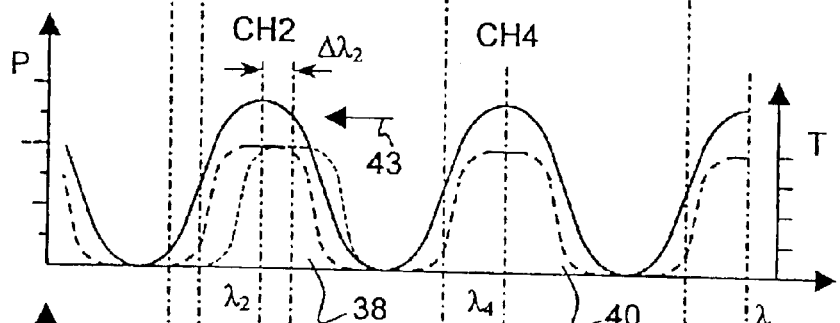
FIG. 6b is the graph as shown in FIG. 3b but with input channels shifted by a wavelength $-\Delta\lambda_2$.

FIGS. 6a and 6b show similar graphs as FIGS. 3a and 3b, but with center wavelengths $\lambda_1$, $\lambda_3$, $\lambda_5$ and $\lambda_2$, $\lambda_4$ that are not aligned with the transmission and reflectivity responses of the interleaver 22. As indicated by an arrow 41 in FIG. 6a, the center wavelengths $\lambda_1$, $\lambda_3$ and $\lambda_5$ of the first optical signal are shifted by an amount $\Delta\lambda_1$ to larger wavelengths, if compared with a center wavelength $\Lambda_1$ of the transmission/reflectivity response of the interleaver 22. The second optical signal has, in the spectral range, been shifted by an amount of $-\Delta\lambda_2$, i.e. to smaller wavelengths, such that the center wavelength $\lambda_2$ is not aligned anymore with the center wavelength $\Lambda_2$ of the transmission/reflectivity response of the optical interleaver 22. If both optical signals were interleaved in optical interleaver 22 without passing the tunable optical filters 18, 20, considerable crosstalk would be unavoidable due to the overlap of adjacent channels.

Since both optical filters 18 and 20 are tunable, it is now possible to collectively shift the passband frequencies 32, 34, 36 by the amount of $\Delta\lambda_1$ so as to achieve alignment with channels CH1, CH3 and CH5. The same applies to the passbands 38 and 40 of the second filter 20, as represented in FIG. 6b. In FIGS. 6a and 6b, passbands 32 and 38 that have not been shifted are indicated by thin broken lines for comparison.

Figure 7A:
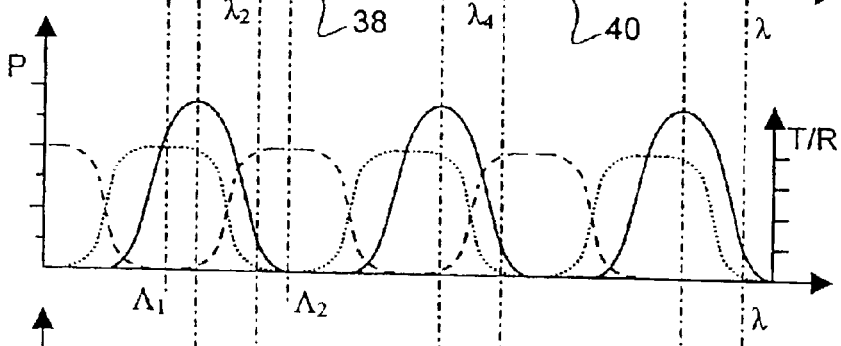
FIG. 7a is a combined graph of the spectral intensity distribution of the filtered input signal of FIG. 6a and of the filter function of the interleaver.

FIG. 7a shows the spectral intensity distribution of the first input signal as shown in FIG. 6a after having been filtered by the first optical filter 18. This distribution is shifted by the amount $\Delta\lambda_1$ wherein the bandwidth of the filtered signals has not been effected by shifting the passband frequencies of the optical filter 18.

Figure 7B:
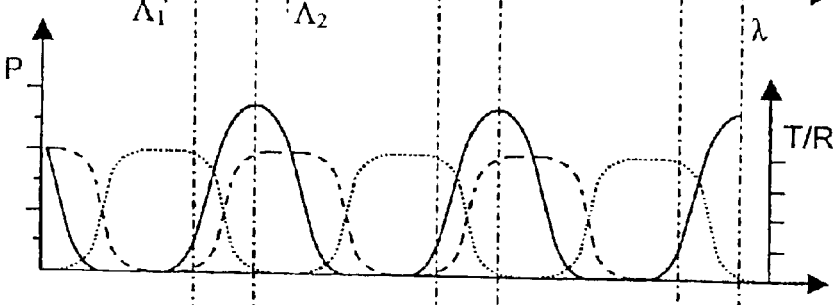
FIG. 7b is a combined graph of the spectral intensity distribution of the filtered input signal of FIG. 6b and of the filter function of the interleaver.

FIG. 7b shows the spectral intensity distribution of the second input signal as shown in FIG. 6b after having been filtered by the first optical filter 20. This distribution is shifted by $-\Delta\lambda_2$, and again the bandwidth of the filtered signals has not been affected.

Figure 8:
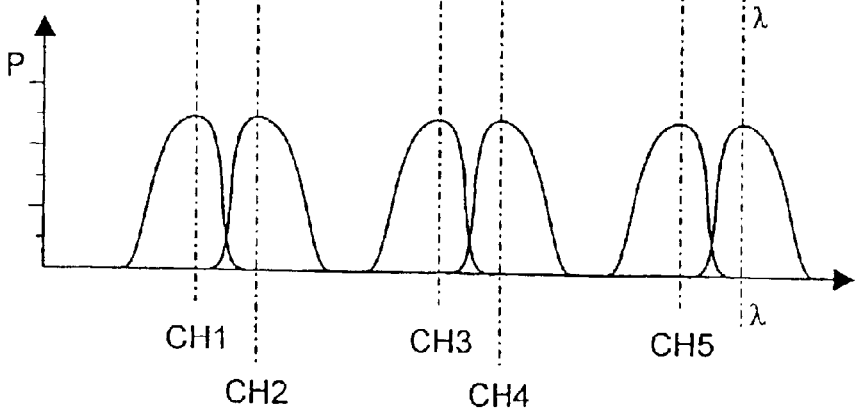
FIG. 8 is a graph of the spectral intensity distribution of the interleaved optical signals of FIGS. 7a and 7b at the output port of the interleaver circuit as shown in FIG. 1 or 2.

FIG. 8 shows the spectral intensity distribution of the interleaved optical signals of FIGS. 7a and 7b at the output port 16 of the interleaver circuit 10 or 10'. The resulting intensity distribution is irregular in the sense that the channels CH1, CH2, . . . CH5 are not equally spaced anymore. Instead, the channels are arranged in pairs of two, each pair being separated from the following pair by the periodicity of the input signals. Compared to FIG. 5, crosstalk between each such pair of channels is slightly increased, but channel overlap is still small.

Thus, the interleaver circuit 10 or 10' allows to interleave first and second optical signals each comprising a plurality of equally spaced optical channels even in those cases in which the center wavelength of the optical channels do not exactly match the pre-allocated filter function of the interleaver.

It goes without saying that additional flexibility can be achieved if not only the first and second filters 18, 20 but also the interleaver 22 is tunable. The filter functions of interleaver 22 as shown in FIGS. 7a, 7b can then be shifted. This alters the global filter function of the interleaver circuit 10 or 10' and therefor the intensity distributions as shown in FIG. 5 or 8.

Figure 9:
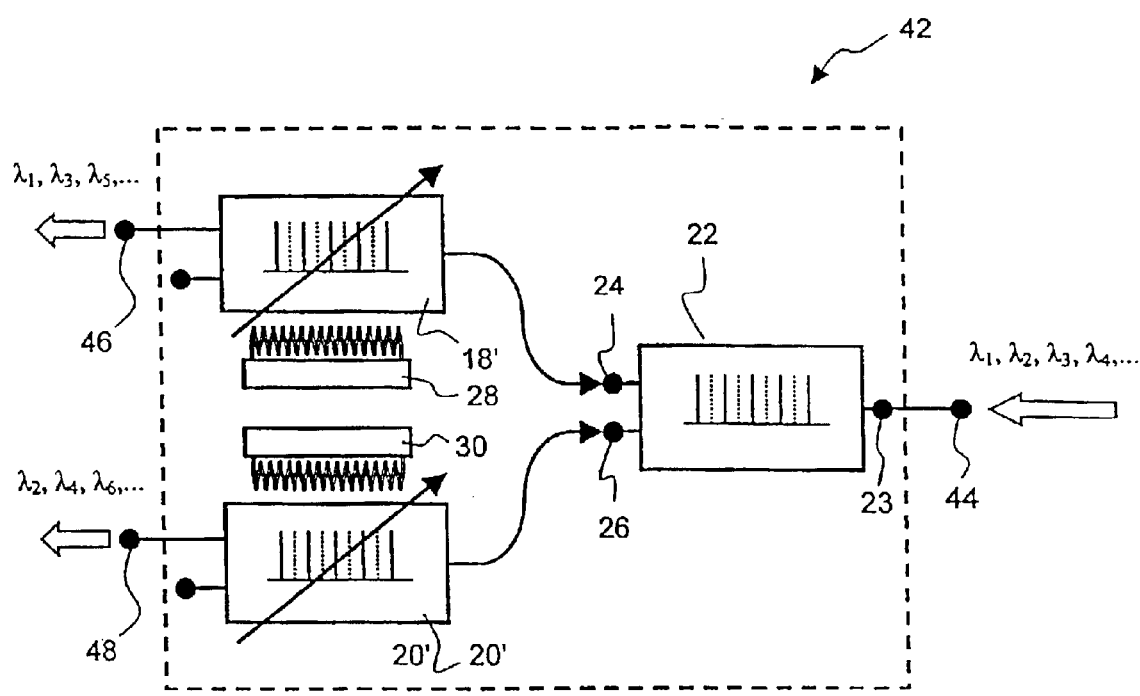
FIG. 9 illustrates an embodiment of an de-interleaver circuit according to the present invention.

In FIG. 9 a de-interleaver circuit is designated in its entirety by reference numeral 42. De-Interleaver 42 comprises the same parts as interleaver 10' shown in FIG. 2. Only the input and output ports are interchanged. Thus de-interleaver 42 has only one input port 44 that is connected to interleaver 22, and two output ports 46 and 48 that are connected to first and second interleavers 18' and 20', respectively. De-interleaver 10' is suitable for de-interleaving optical signals with not equally spaced optical channels as shown in FIG. 8.

What is claimed is:

1. Interleaver circuit for interleaving optical signals, comprising:
   a first input port;
   a second input port;
   an output port;
   a first optical filter that has a first filter function with periodic passbands and is connected to the first input port;
   a second optical filter that has a second filter function with periodic passbands and is connected to the second input port;
   an optical interleaver comprising:
      a multiplexing port connected to the output port,
      a first de-multiplexing port connected to the first input port via the first optical filter, and
      a second de-multiplexing port connected to the second input port via the second optical filter;
   wherein at least one optical filter is tunable such that the passbands are collectively shiftable without altering the periodicity of the filter function.

2. Interleaver circuit according to claim 1, wherein the at least one optical filter is tuned such that the first filter function is offset with respect to the second filter function by an amount that is distinct from half of a passband spacing by which the passbands of the first and the second filter function are spaced apart.

3. Interleaver circuit according to claim 1, wherein the at least one optical filter is a tunable optical interleaver with only one de-multiplexing port being used.

4. Interleaver circuit according to claim 3, wherein temperature control means are provided for controlling the temperature of the tunable optical interleaver.

5. Interleaver circuit according to claim 1, wherein the optical interleaver being connected to the first and the second optical filter is also tunable such that its passbands are collectively shiftable without altering the periodicity of its filter function.

6. De-interleaver circuit for de-interleaving optical signals, comprising:
   an input port;
   a first output port;
   a second output port;
   a first optical filter that has a first filter function with periodic passbands and is connected to the first output port;
   a second optical filter that has a second filter function with periodic passbands and is connected to the second output port;
   an optical interleaver comprising:
      a multiplexing port connected to the input port,
      a first de-multiplexing port connected to the first output port via the first optical filter, and
      a second de-multiplexing port connected to the second output port via the second optical filter;
   wherein at least one optical filter is tunable such as the passband frequencies are collectively shiftable without altering the periodicity of the filter function.

7. Method of interleaving a first and a second optical signal each having a plurality of multiplexed channels of light, the method comprising the steps of:
   filtering the first optical signal with a first optical filter that has a first filter function with periodic passbands;
   filtering the second optical signal with a second optical filter that has a second filter function with periodic passbands;
   tuning at least one optical filter such that its passband frequencies are aligned with the plurality of multiplexed channels of the respective optical signal, thereby collectively shifting the passband frequencies without altering the periodicity of the filter function;

combining the filtered optical signals in an optical interleaver in order to obtain an optical signal having a plurality of interleaved multiplexed channels of light.

8. Method according to claim 7, wherein the at least one optical filter is a tunable optical interleaver with only one de-multiplexing port being used.

9. Method according to claim 8, wherein the optical interleaver is tuned by controlling its temperature.

10. Method of de-interleaving an optical signal having a plurality of interleaved multiplexed channels, the method comprising the steps of:

separating the optical signal in an optical de-interleaver in order to obtain a first and a second de-interleaved optical signal each having a plurality of multiplexed channels;

filtering the first optical signal with a first optical filter that has a first filter function with periodic passbands;

filtering the second optical signal with a second optical filter that has a second filter function with periodic passbands;

tuning at least one optical filter such that its passband frequencies are aligned with a plurality of multiplexed channels of the respective optical signal, thereby collectively shifting the passband frequencies without altering the periodicity of the filter function.

* * * * *